United States Patent
Willburn et al.

(10) Patent No.: US 9,440,297 B2
(45) Date of Patent: Sep. 13, 2016

(54) TUBING SHAPING TOOL AND METHOD OF USE

(71) Applicants: Eddie Willburn, Amarillo, TX (US); Roger D. Hayes, Amarillo, TX (US)

(72) Inventors: Eddie Willburn, Amarillo, TX (US); Roger D. Hayes, Amarillo, TX (US)

(*) Notice: Subject to any disclaimer, the term of this patent is extended or adjusted under 35 U.S.C. 154(b) by 51 days.

(21) Appl. No.: 14/216,536

(22) Filed: Mar. 17, 2014

(65) Prior Publication Data

US 2014/0260883 A1 Sep. 18, 2014

Related U.S. Application Data

(60) Provisional application No. 61/801,439, filed on Mar. 15, 2013.

(51) Int. Cl.

| | |
|---|---|
| *B26D 3/00* | (2006.01) |
| *B23D 21/10* | (2006.01) |
| *B23B 5/16* | (2006.01) |
| *B26D 3/16* | (2006.01) |
| *B26D 7/01* | (2006.01) |

(52) U.S. Cl.
CPC ............... *B23D 21/10* (2013.01); *B23B 5/167* (2013.01); *B26D 3/166* (2013.01); *B26D 3/169* (2013.01); *B26D 7/01* (2013.01); *Y10T 83/0259* (2015.04)

(58) Field of Classification Search
CPC ...... B23B 5/167; B23D 21/10; B23D 3/166; B23D 3/169; B23D 7/01; Y10T 83/0259

USPC ............ 30/278; 82/113; 408/206, 223, 228; 83/869

See application file for complete search history.

(56) References Cited

U.S. PATENT DOCUMENTS

| | | | | |
|---|---|---|---|---|
| 3,232,145 A | * | 2/1966 | Wilson | B23B 5/167 144/205 |
| 4,149,820 A | * | 4/1979 | Newlin | B23G 1/261 408/120 |
| 4,229,129 A | * | 10/1980 | Schaenzer | B23B 5/167 408/211 |
| 4,678,380 A | * | 7/1987 | Zahuranec | B23B 5/167 407/33 |
| 2012/0207557 A1 | * | 8/2012 | Durfee | B23B 51/009 408/223 |

FOREIGN PATENT DOCUMENTS

EP 2082833 A1 * 7/2009 ............. B23B 5/167

* cited by examiner

*Primary Examiner* — Omar Flores Sanchez
(74) *Attorney, Agent, or Firm* — Shannon L Warren

(57) ABSTRACT

A shaping tool is having a cap, a blade portion and a body. The blade portion having a one or more pairs of blades. The body having a slot being substantially vertical which the blade portion freely slides vertically through. The cap having a first cylindrical portion with an open mouth at a lower portion and a cap at an upper portion. The body having a first cylindrical portion with an open mouth at a lower portion and a cap at an upper portion. The open mouth of the cap comprising an internal diameter being greater than an external diameter of the body. The shaping tool comprising an assembled configuration comprising the blade portion held between the cap and the body and partially within the slot, and the one or more pairs of blades exposed within the body.

9 Claims, 13 Drawing Sheets

TUBING SHAPING TOOL AND METHOD OF USE

This disclosure claims the benefit of U.S. Patent Application No. 61/801,439, filed Mar. 15, 2013. The anniversary of that filing falls on a Saturday, thereby allowing for the filing of this application on Mar. 17, 2014.

BACKGROUND

This disclosure relates generally to a shaping tool. One example of a shaping tool is referred to at http://www.sharkbiteplumbing.com/tools and http://www.sharkbiteplumbing.com/sharkbite-u702-safe-seal-tool. However, none of the known inventions and patents, taken either singularly or in combination, is seen to describe the instant disclosure as claimed. Accordingly, an improved shaping tool would be advantageous.

SUMMARY

Two systems and a method are disclosed.

A shaping tool is disclosed comprising a cap, a blade portion and a body. Said blade portion comprises a one or more pairs of blades. Said body having a slot being substantially vertical which said blade portion freely slides vertically through. Said cap comprises a first cylindrical portion with an open mouth at a lower portion and a cap at an upper portion. Said body comprises a first cylindrical portion with an open mouth at a lower portion and a cap at an upper portion. Said open mouth of said cap comprising an internal diameter being greater than an external diameter of said body. Said shaping tool comprising an assembled configuration comprising said blade portion held between said cap and said body and partially within said slot, and said one or more pairs of blades exposed within said body. Said body having an internal diameter being substantially equal to an external diameter of a tubing. A first end of said tubing freely slides through said open mouth of said body and presses into a one said one or more pairs of blades.

A method of shaping a portion of a tubing using shaping tool is disclosed comprising: inserting a first end of a tubing into an open mouth of a shaping tool, sliding said first end into a one or more pairs of blades within said open mouth of said shaping tool, rotating said shaping tool relative to said tubing, shaving said first end between said one or more pairs of blades, and shaving an edge of said first end of said tubing. Wherein, said shaping tool comprises a cap, a blade portion and a body. Said blade portion comprises a one or more pairs of blades. Said body having a slot being substantially vertical which said blade portion freely slides vertically through. Said cap comprises a first cylindrical portion with an open mouth at a lower portion and a cap at an upper portion. Said body comprises a first cylindrical portion with an open mouth at a lower portion and a cap at an upper portion. Said open mouth of said cap comprising an internal diameter being greater than an external diameter of said body. Said shaping tool comprising an assembled configuration comprising said blade portion held between said cap and said body and partially within said slot, and said one or more pairs of blades exposed within said body. Said body having an internal diameter being substantially equal to an external diameter of a tubing. A first end of said tubing freely slides through said open mouth of said body and presses into a one said one or more pairs of blades.

DETAILED DESCRIPTION

Described herein is a shaping tool. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
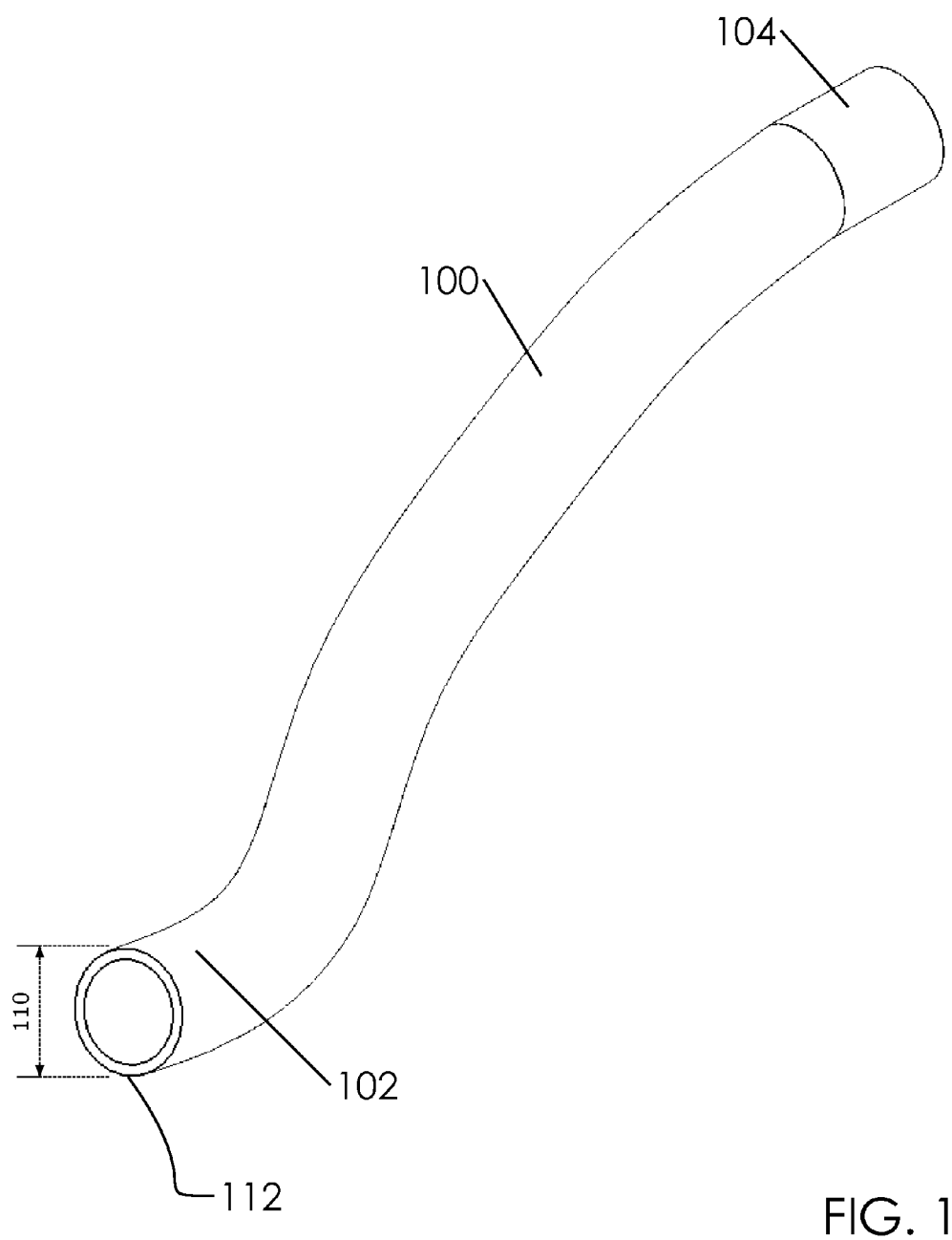
FIG. 1 illustrates an elevated perspective overview of a tubing 100.

FIG. 1 illustrates an elevated perspective overview of a tubing 100. In one embodiment, said tubing 100 can comprise a first end 102, a second end 104 and an external diameter 108. In one embodiment, said first end 102 can comprise a first external diameter 110. In one embodiment, said first end 102 can comprise an edge 112 which can be shaved with the system described below.

Figure 2A:
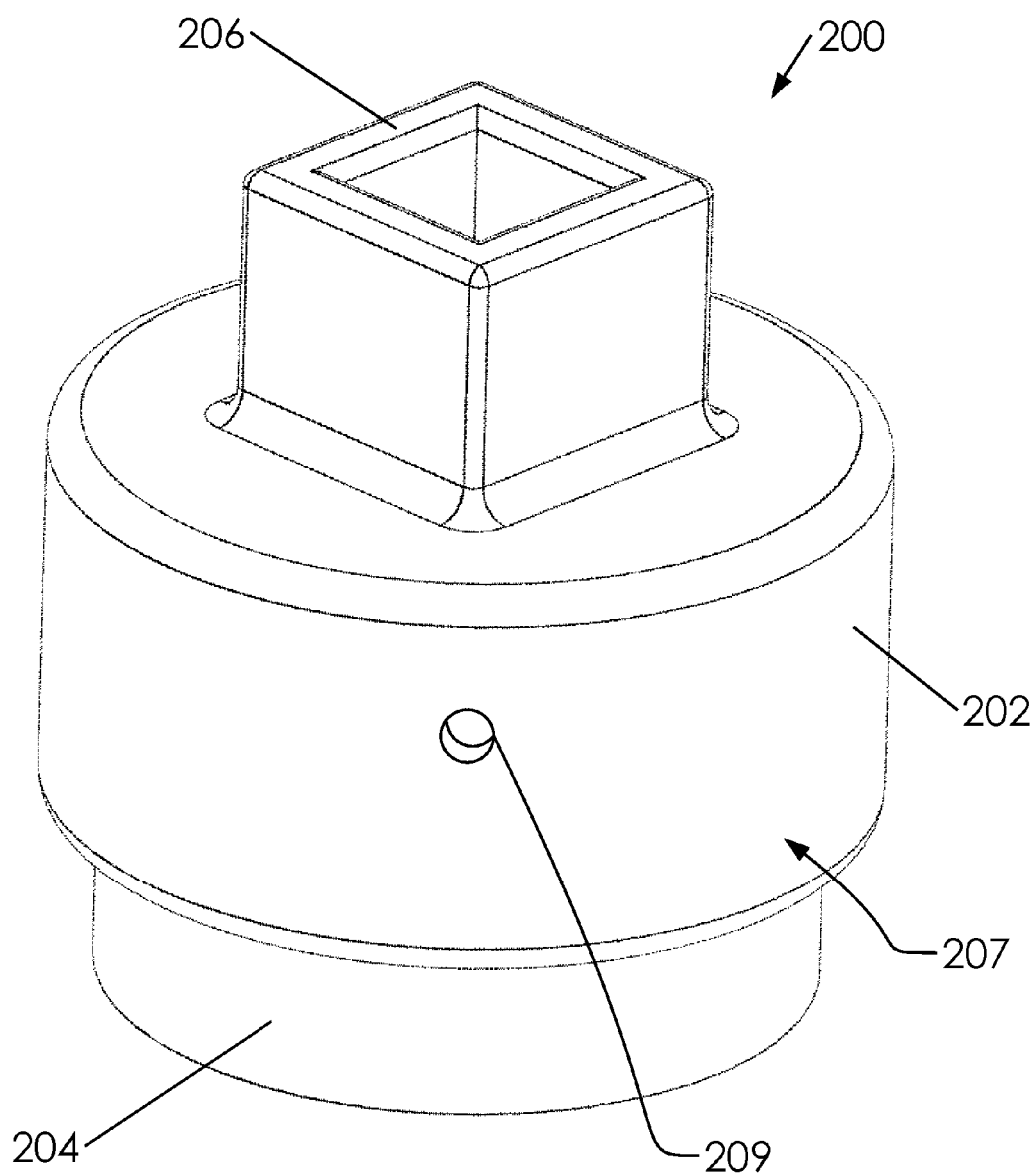
FIGS. 2A and 2B illustrates an elevated perspective overview and an elevated bottom perspective overview of a shaping tool 200.
Figure 2B:
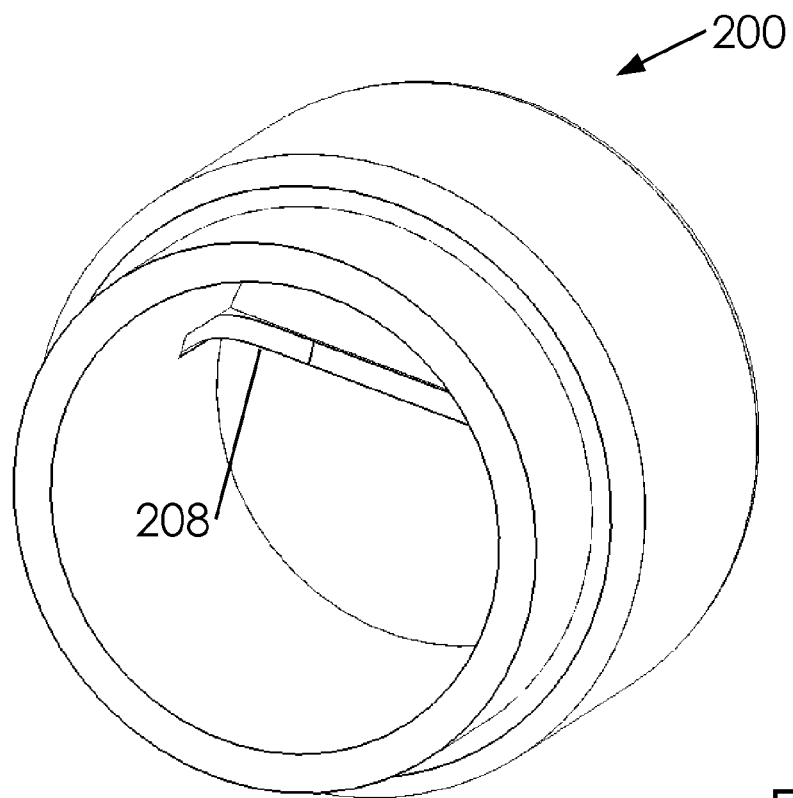

FIGS. 2A and 2B illustrates an elevated perspective overview and an elevated bottom perspective overview of a shaping tool 200. In one embodiment, said shaping tool 200 can comprise a cap 202, a body 204, a ratchet socket 206 and a blade portion 208.

Said blade portion 208 can comprise a polymer, fiber-filled polymer, metal, or ceramic.

In one embodiment, said shaping tool 200 can comprise a knurled or otherwise textured surface complementary of human grip while having wet or slippery materials on the hands.

In one embodiment, said cap 202 can comprise a one or more apertures 209 positioned radially among the cylindrical axis of gadget. In one embodiment, said one or more apertures 209 can comprise a vent which may be useful for blowing debris out of said shaping tool 200.

Figure 2C:
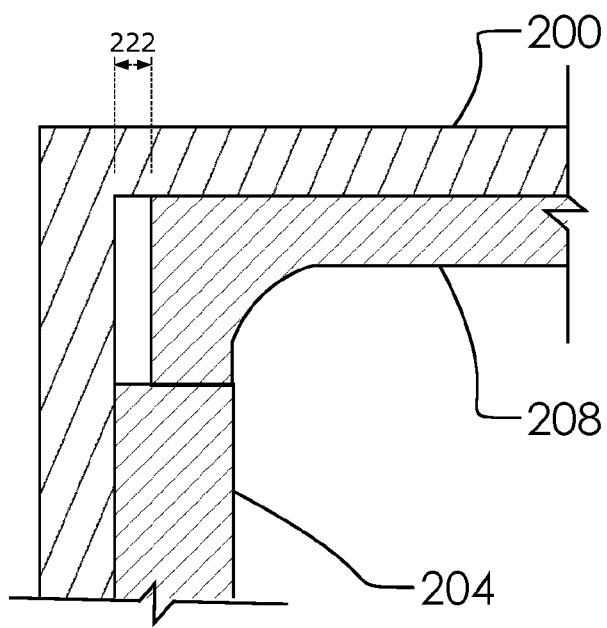
FIG. 2C illustrates a detailed cross-section elevated front view of said shaping tool 200.

FIG. 2C illustrates a detailed cross-section elevated front view of said shaping tool 200. In one embodiment, said blade portion 208 can comprise a relief gap 222 between said shaping tool 200 and said blade portion 208 (which can comprise 0.020"). In one embodiment, said relief gap 222 can allow for compacting of exhausted materials, causing a non-contiguous material storage filament to act as bearing, then further centering tubing into cutting radius.

In one embodiment, debris caught in said relief gap 222 can be vented out of said shaping tool 200 through said one or more apertures 209.

Figure 3A:
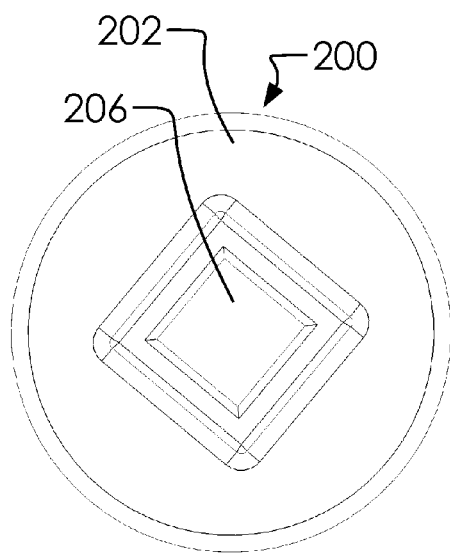
FIGS. 3A, 3B and 3C illustrate an elevated top view, an elevated side view and an elevated bottom view of said shaping tool 200.
Figure 3B:
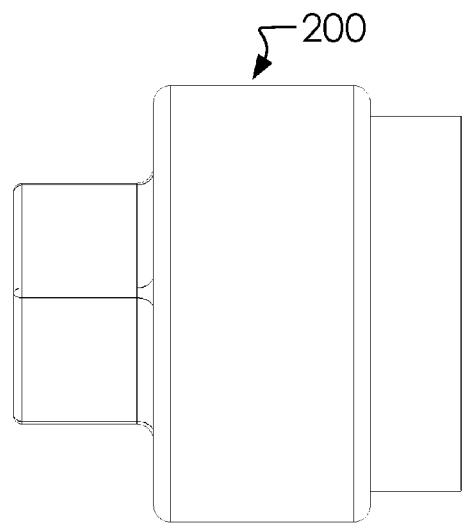
Figure 3C:
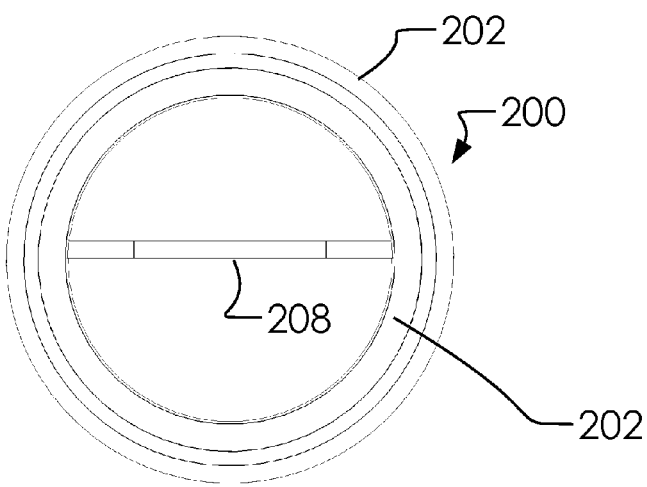

FIGS. 3A, 3B and 3C illustrate an elevated top view, an elevated side view and an elevated bottom view of said shaping tool 200.

Figure 4:
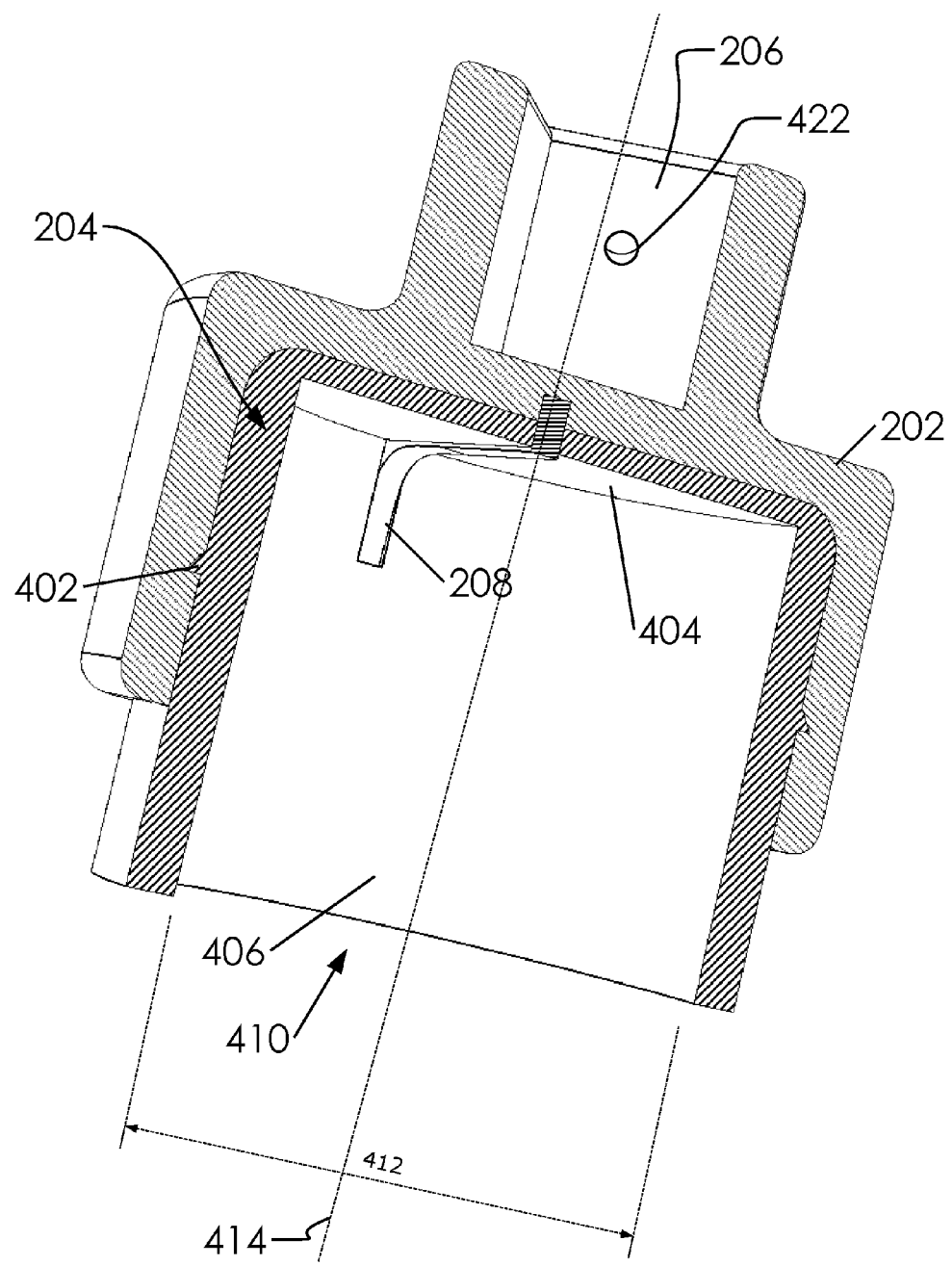
FIG. 4 illustrates a perspective cross-section overview of said shaping tool 200.

FIG. 4 illustrates a perspective cross-section overview of said shaping tool 200. In one embodiment, said shaping tool 200 can comprise a lip 402, a top portion 404, a side portion 406 and a mouth 410. In one embodiment, said mouth 410 can comprise a substantially cylindrical cavity for receiving a portion of said tubing 100 (such as said first end 102). In one embodiment, said mouth 410 of said body 204 can comprise an internal diameter equal to or greater than said external diameter 108 of said tubing 100. Accordingly, shaping a portion of said first end 102 of said tubing 100 can comprise: inserting said first end 102 of said tubing 100 into said mouth 410; pressing said first end 102 against said blade portion 208; rotating said shaping tool 200 about a central axis 414 of said shaping tool 200; and shaving an outer portion of said first end 102 according to a one or more cutting edges (discussed below) of said blade portion 208.

In one embodiment, said ratchet socket 206 can comprise a one or more notches 422 to facilitate interlocking of known/typical ratchets and socket extensions on inner surface of square receive.

Figure 5A:
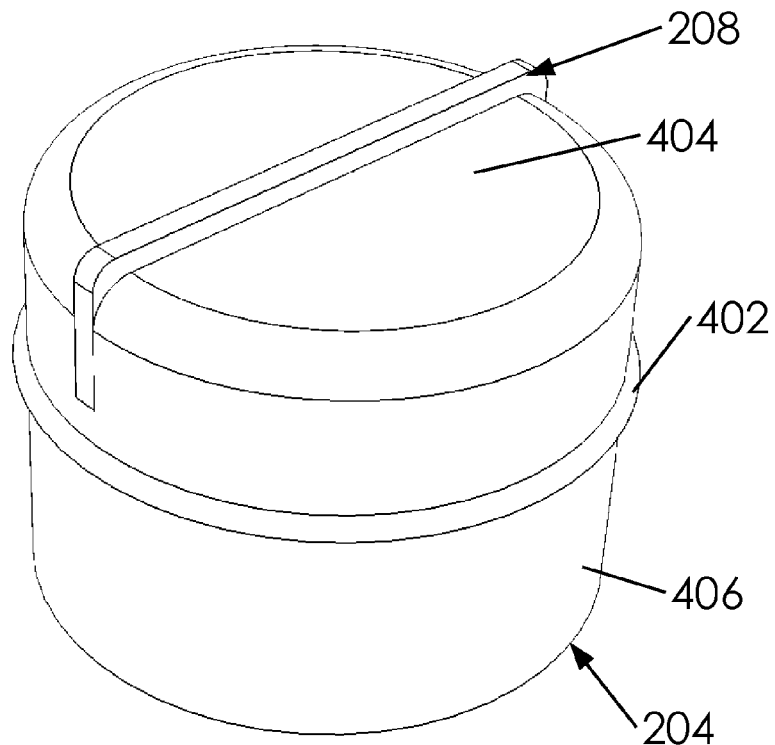
FIGS. 5A and 5B illustrate an elevated perspective overview and an elevated perspective bottom view of said body 204 with said cap 202 removed.
Figure 5B:
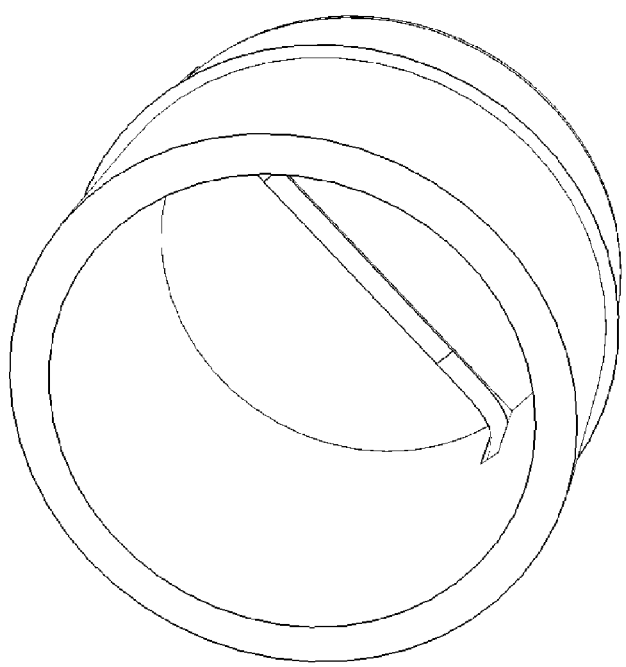

FIGS. 5A and 5B illustrate an elevated perspective overview and an elevated perspective bottom view of said body 204 with said cap 202 removed.

Figure 6A:
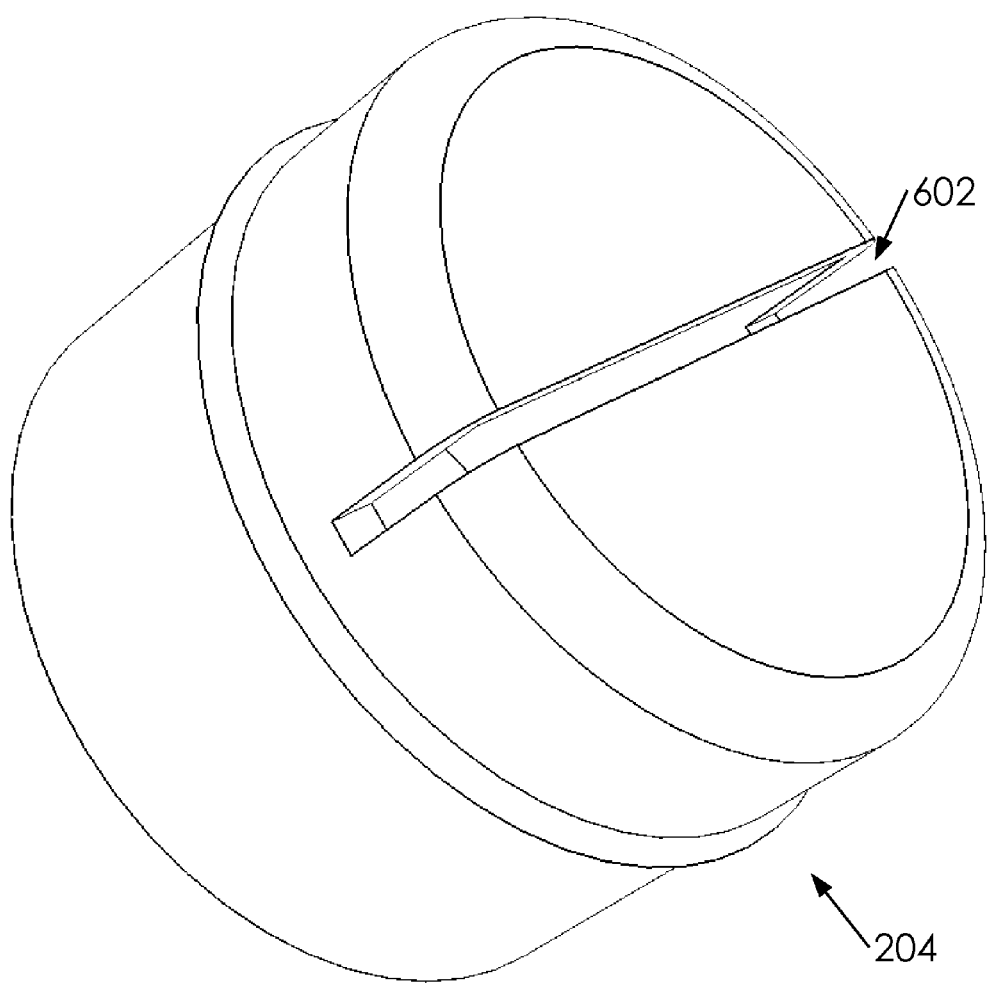
FIGS. 6A, 6B and 6C illustrate an elevated perspective overview, an elevated top view and an elevated side view of said body 204 with said cap 202 and said blade portion 208 removed. In one embodiment, said body 204 can have a slot 602.
Figure 6B:
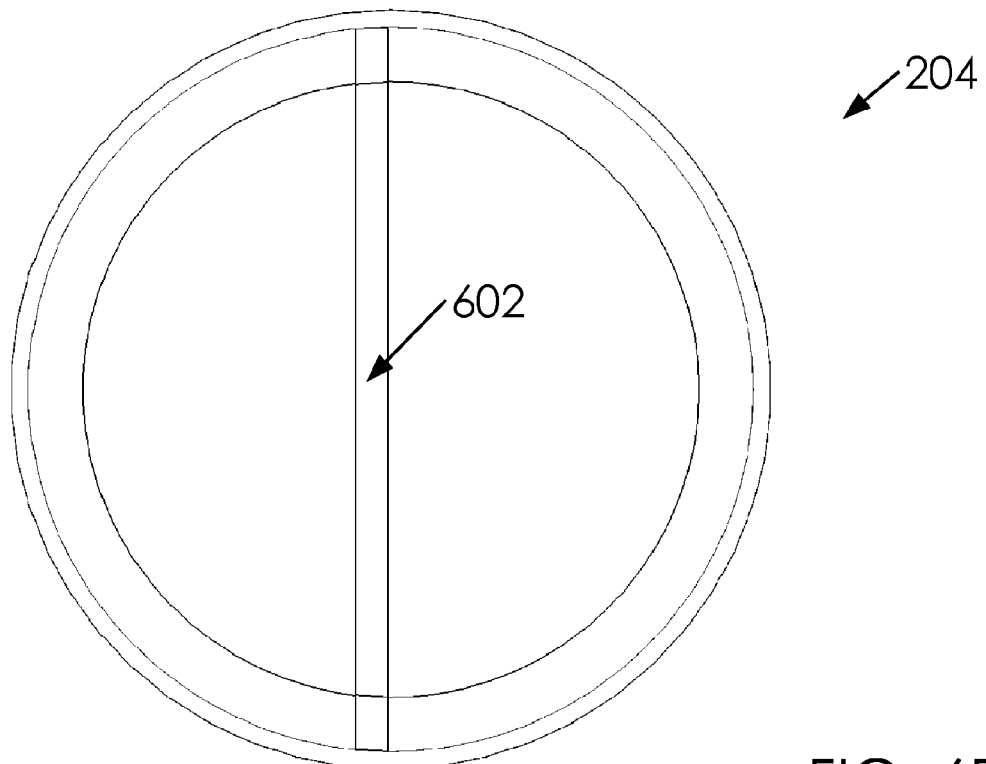
Figure 6C:
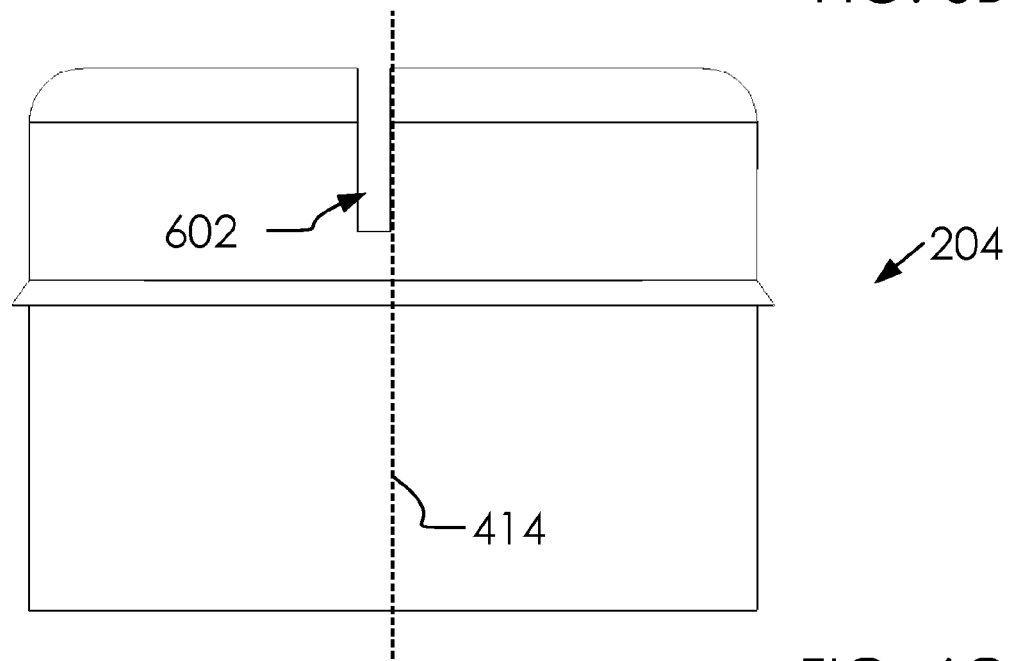

FIGS. 6A, 6B and 6C illustrate an elevated perspective overview, an elevated top view and an elevated side view of said body 204 with said cap 202 and said blade portion 208 removed. In one embodiment, said body 204 can have a slot 602. In one embodiment, said slot 602 can comprise a cut in said top portion 404 of said body 204 being off of said central axis 414.

Figure 7A:
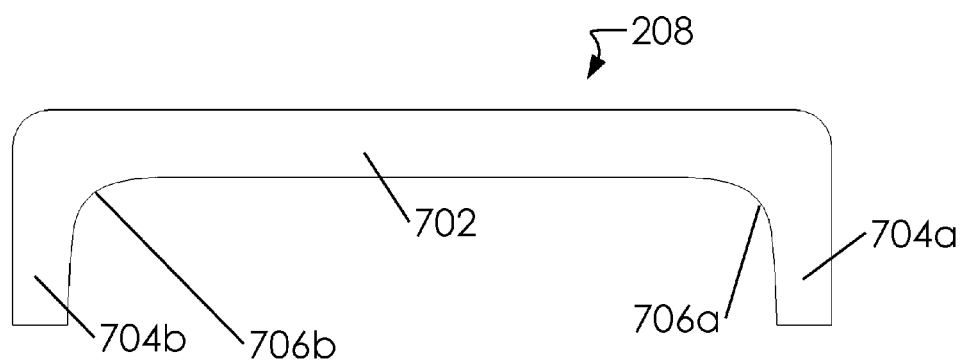
FIGS. 7A and 7B illustrate an elevated front view and an elevated perspective overview.
Figure 7B:
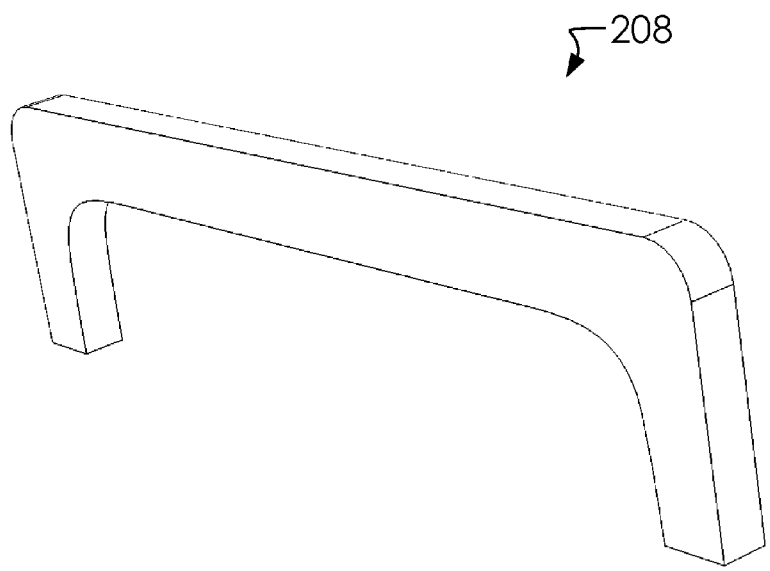

FIGS. 7A and 7B illustrate an elevated front view and an elevated perspective overview. In one embodiment, said blade portion 208 can comprise a body 702, a one or more cutting edges and a one or more legs. In one embodiment, said one or more cutting edges can comprise a first cutting edge 706*a* and a second cutting edge 706*b*. In one embodiment, said one or more legs can comprise a first leg 704*a* and a second leg 704*b*.

In one embodiment, said blade portion 208 can be described as having asymmetrical cutting edges, one of sharpness, opposite of dullified edges, said first performing cutting/scraping operation where said second performs burnishing/buffing of edges of said tubing 100 (or any polymer tubing). That is, in one embodiment, said first cutting edge 706*a* can be sharp and second cutting edge 706*b* can be dull. Accordingly, said first cutting edge 706*a* can shave a portion of said first end 102 and said second cutting edge 706*b* can rub away and flatten any sharpened edges in said first end 102.

Figure 8:
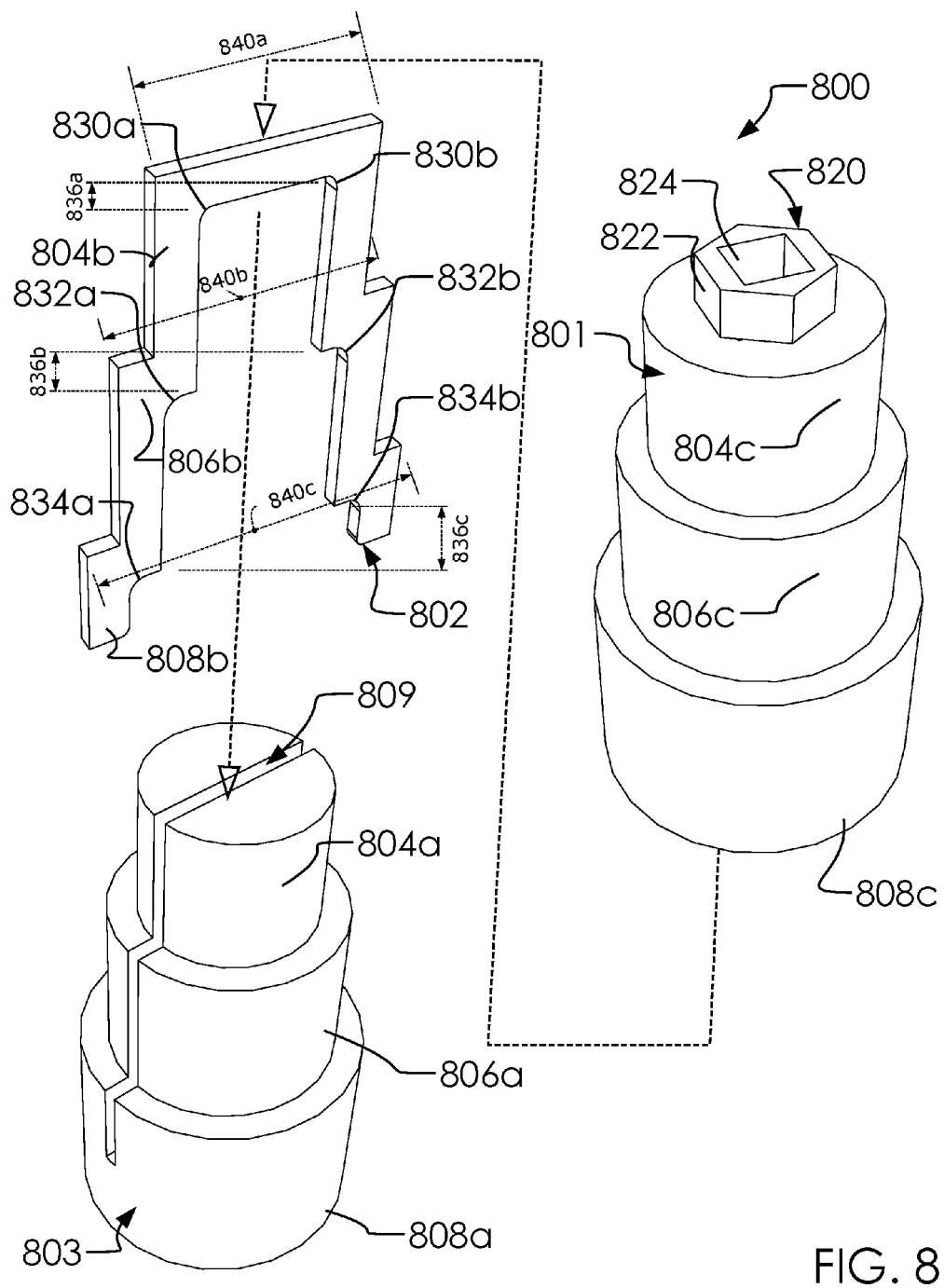
FIG. 8 illustrates a perspective exploded overview of an alternative shaping tool 800.

FIG. 8 illustrates a perspective exploded overview of an alternative shaping tool 800. In one embodiment, said alternative shaping tool 800 can comprise a cap 801, a blade portion 802 and a body 803. In one embodiment, said alternative shaping tool 800 can comprise a one or more steps; said body 803 can comprise a first step 804*a*, a second step 806*a* and a third step 808*a*; said blade portion 802 can comprise a first step 804*b*, a second step 806*b* and a third step 808*b*; and said cap 801 can comprise a first step 804*c*, a second step 806*c* and a third step 808*c*.

Similar to said slot 602 of said shaping tool 200, said body 803 comprises a slot 809. In one embodiment, said slot 809 can comprise a vertical cut in said body 803 designed to receive a portion of said blade portion 802. In one embodiment, said blade portion 802 slides into said slot 809 of said body 803, and said cap 801 slides around said blade portion 802 and said cap 801.

Said cap 801 can comprise a ratchet socket 820 having a hex outer surface 822 and a square socket 824. In one embodiment, said square socket 824 can comprise a ⅜" square drive. In another embodiment, said hex outer surface 822 can receive a socket wrench. Thus, in one embodiment said ratchet socket 820 can be configured to apply torque to said alternative shaping tool 800 from said hex outer surface 822 or said square socket 824.

In one embodiment, using said shaping tool 200 and/or said alternative shaping tool 800 can comprise pressing either of said tools on said tubing 100 to smooth and remove unwanted portions of said tubing 100. In one embodiment, twisting and pressing said shaping tool 200 and/or said alternative shaping tool 800 into said tubing 100 will do the trimming and smoothing.

In one embodiment, said blade portion 802 can comprise a one or more pairs of blades corresponding to said one or more steps. For example, in one embodiment, said first step 804*b* can comprise a first blade 830*a* and a second blade 830*b* being horizontally separated by a distance 836*a*; said second step 806*b* can comprise a first blade 832*a* and a second blade 832*b* being horizontally separated by a distance 836*b*; and said third step 808*b* can comprise a first blade 834*a* and a second blade 834*b* being horizontally separated by a distance 836*c*. In one embodiment, said first step 804*b* can comprise an external diameter 840*a*, said second step 806*b* can comprise an external diameter 840*b*, and said third step 808*b* can comprise an external diameter 840*c*. Thus, in one embodiment said blade portion 802 can comprise a one or more external diameters.

FIGS. 9A, 9B, 9C and 9D illustrate a perspective lower view of said alternative shaping tool 800, first with just said body 803; next with said body 803 and said blade portion 802; then said body 803; and finally with said cap 801, said blade portion 802 and said body 803.

Figure 9A:
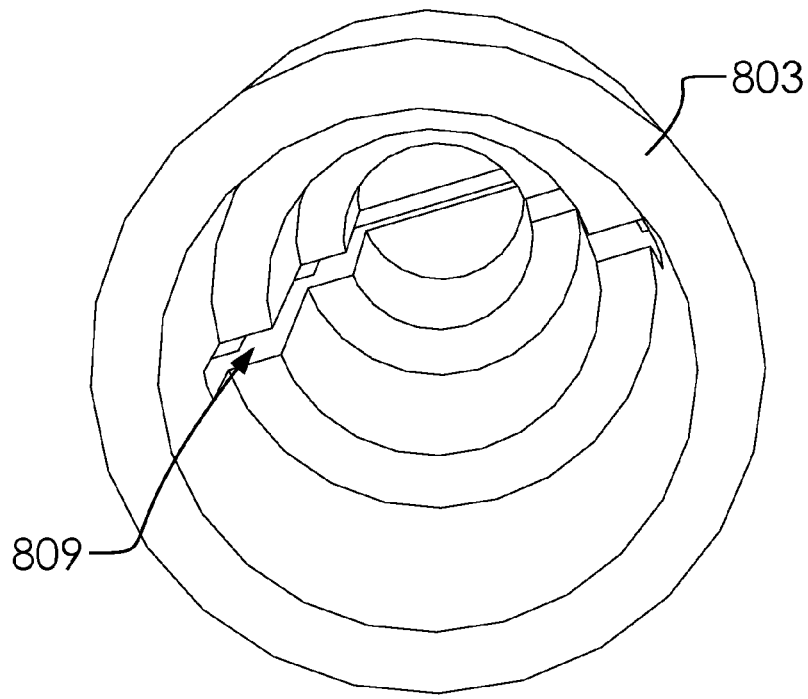
FIGS. 9A, 9B, 9C and 9D illustrate a perspective lower view of said alternative shaping tool 800, first with just said body 803; next with said body 803 and said blade portion 802; then said body 803; and finally with said cap 801, said blade portion 802 and said body 803.
Figure 9B:
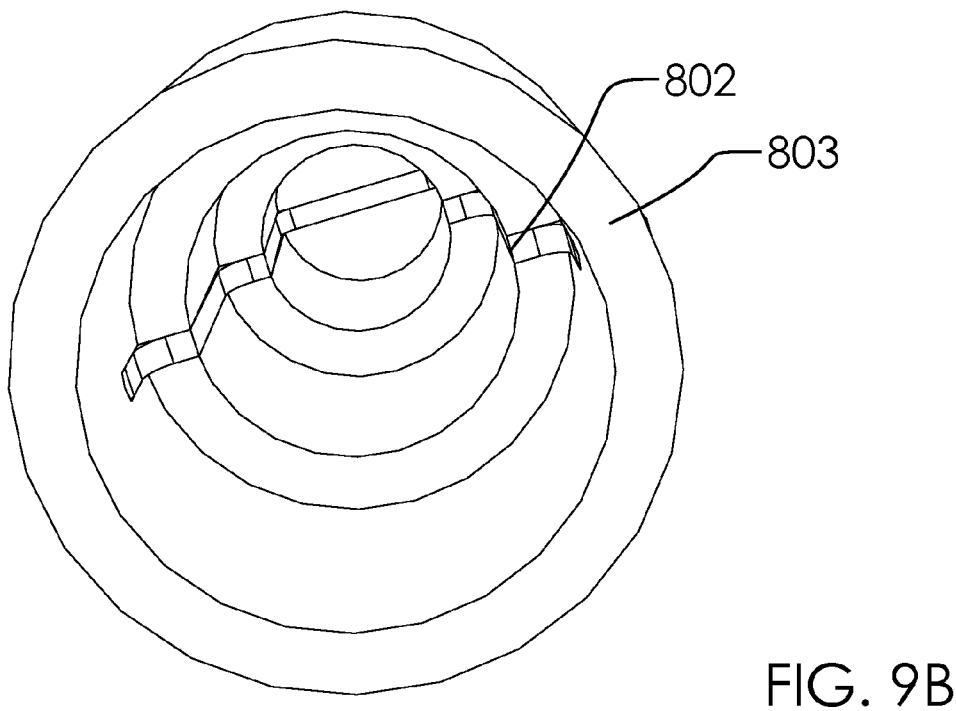

In one embodiment, said slot 809 of said body 803 can hold said blade portion 802 such that said one or more pairs of blades are exposed within said body 803, but not the remaining portions of said blade portion 802, as illustrated in FIG. 9B. accordingly, said first end 102 of said tubing 100 can slide within said alternative shaping tool 800, and rotate freely in a respective one of said one or more steps corresponding to an external diameter of said tubing 100.

Figure 9C:
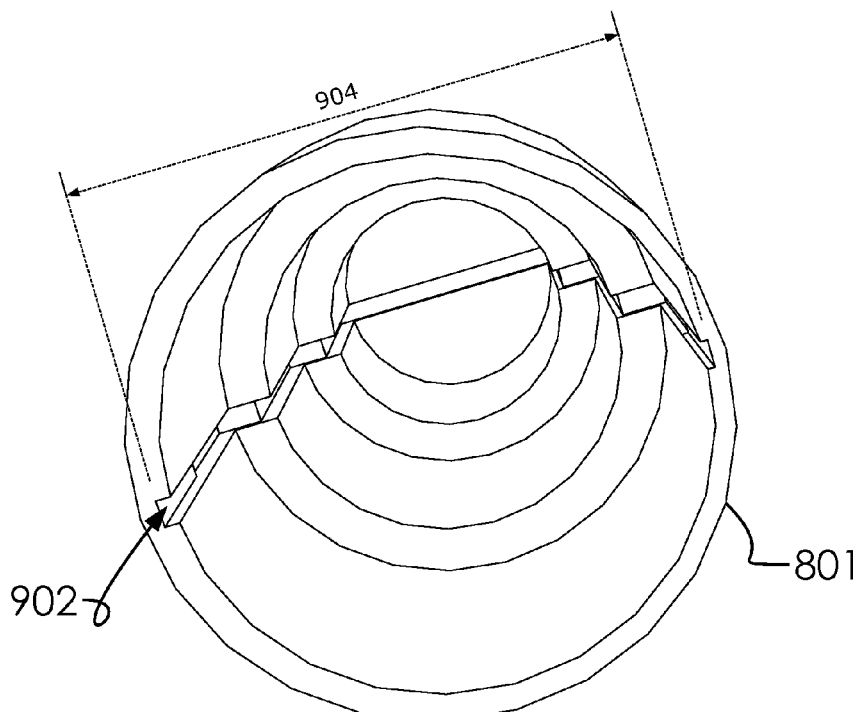

FIG. 9C illustrates a perspective lower view of said cap 801. In one embodiment, said cap 801 can comprise a slot 902 can comprise a one or more widths corresponding to said one or more steps. For example, in one embodiment, said slot 902 can comprise a third width 904 corresponding to an external width of said blade third step 808b of said blade portion 802. However, as discussed in FIG. 2C, said relief gap 222 can allow a space between said cap 801 and said blade portion 802.

Figure 9D:
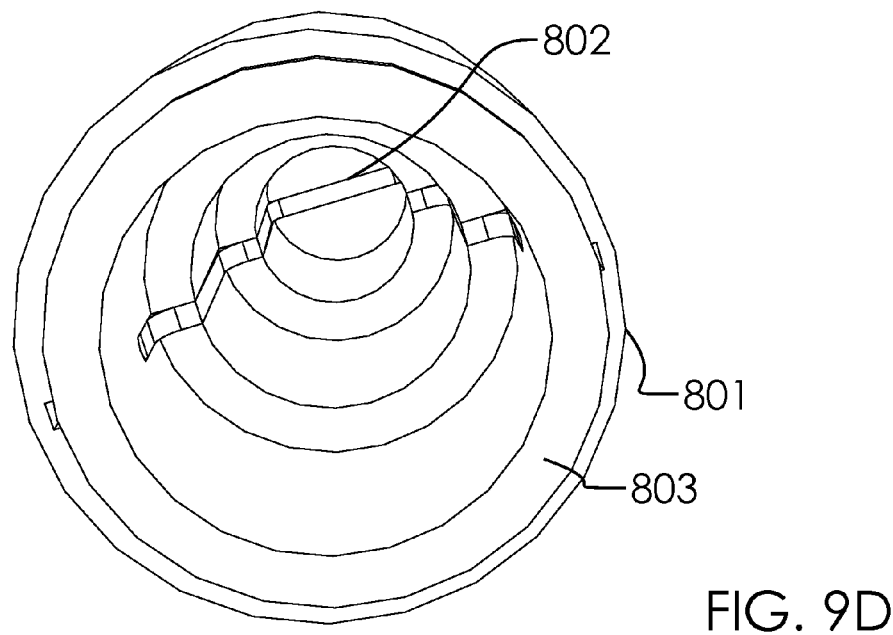

FIG. 9D illustrates a perspective lower view of said alternative shaping tool 800 in an assembled configuration.

Discussion, included above, about the functioning of said shaping tool 200, is applicable here with said alternative shaping tool 800; however, said alternative shaping tool 800 allows for a one or more external diameters of said tubing 100 to be accommodated by providing said one or more steps in said blade portion 802, said cap 801, and said body 803, as shown and described.

Figure 10A:
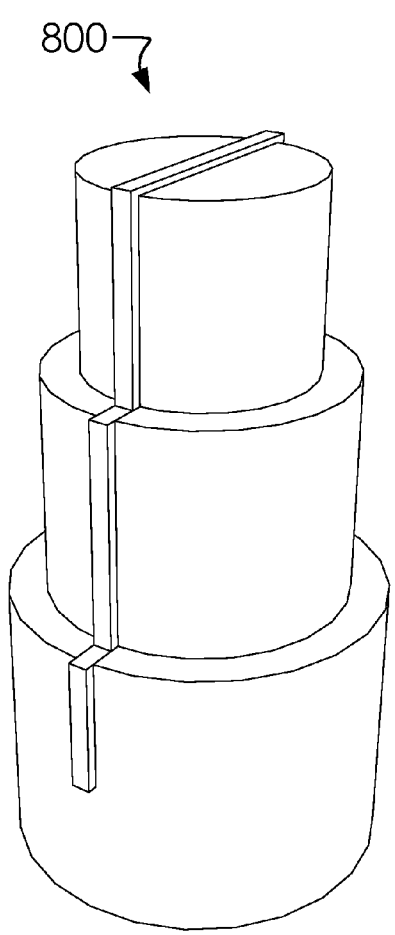
FIGS. 10A and 10B illustrate a perspective overview and a cross-section perspective overview of said alternative shaping tool 800.
Figure 10B:
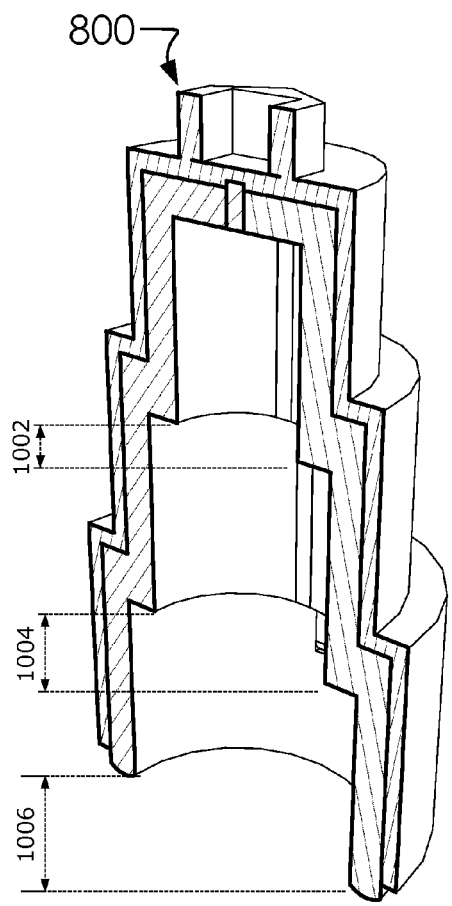

FIGS. 10A and 10B illustrate a perspective overview and a cross-section perspective overview of said alternative shaping tool 800. In one embodiment, said alternative shaping tool 800 can comprise a one or more mouth widths (which can comprise a first mouth width 1002, a second mouth width 1004, and a third mouth width 1006). In one embodiment, said one or more mouth widths can correspond to a one or more external diameters of tubing, such as said first external diameter 110 of said first end 102 of said tubing 100. For example, in one embodiment, said first external diameter 110 can be substantially identical to said second mouth width 1004; wherein, said first end 102 can slide into said alternative shaping tool 800, and press into said first blade 832a and said second blade 832b.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A shaping tool for cutting and shaping a portion of a tubing having an external diameter, said shaping tool comprising:
   a cap, a blade portion and a body;
   said blade portion comprises a one or more pairs of blades;
   said body having a slot being substantially vertical;
   said blade portion freely slides vertically through said slot;
   said cap comprises a first cylindrical portion with an open mouth at a lower end and an enclosed top portion at an upper end;
   said body comprises a first cylindrical portion with an open mouth at a lower end and a partially enclosed top portion at an upper end;
   said open mouth of said cap comprising an internal diameter being greater than an external diameter of said body;
   said shaping tool comprising an assembled configuration comprising
      said blade portion held between said cap and said body and partially within said slot, and
      said one or more pairs of blades exposed within said body;
   said body having an internal diameter being substantially equal to said external diameter of said tubing;
   said open mouth of said body is configured to receive a portion of said tubing and press said one or more pairs of blades into a portion of said tubing;
   said one or more pairs of blades each comprise a first blade and a second blade;
   said first blade is sharpened;
   said second blade is burnished; and
   with said shaping tool in said assembled configuration and with said first end of said tubing in said open mouth of said body,
      rotating said shaping tool relative to said tubing causes said first blade to cut an edge of said first end and said second blade burnishes said edge of said first end of said tubing.

2. The shaping tool of claim 1 wherein
   said first blade is arranged radially at 180 degrees out of phase from said second blade.

3. The shaping tool of claim 1 further comprising a ratchet socket in said upper portion of said cap.

4. The shaping tool of claim 3 wherein
   said ratchet socket comprises a square socket and a hex outer surface.

5. The shaping tool of claim 3 wherein
   said square socket further comprises a one or more notches for releasably pairing with a portion of a ratchet.

6. The shaping tool of claim 1 wherein
   said shaping tool comprises a one or more steps; and
   said one or more steps comprise a one or more cylindrical portions arranged with the largest internal diameter closest to said open mouth and decreasing a size of internal diameter for each step progressing up an internal surface of said shaping tool.

7. The shaping tool of claim 6 wherein said one or more steps are arranged such that:
   said body fits within said cap having a one or more external diameters of said body which are smaller than a one or more internal diameters of said body, and
   said blade portion fits within said cap having a one or more external diameters being smaller than a one or more internal diameters of said cap.

8. A shaping tool for cutting and shaping a portion of a tubing having an external diameter, said shaping tool comprising:
   a cap, a blade portion and a body;
   said blade portion comprises a one or more pairs of blades;
   said body having a slot being substantially vertical;
   said blade portion freely slides vertically through said slot;
   said cap comprises a first cylindrical portion with an open mouth at a lower end and an enclosed top portion at an upper end;
   said body comprises a first cylindrical portion with an open mouth at a lower end and a partially enclosed top portion at an upper end;
   said open mouth of said cap comprising an internal diameter being greater than an external diameter of said body;

said shaping tool comprising an assembled configuration
comprising
said blade portion held between said cap and said body
and partially within said slot, and
said one or more pairs of blades exposed within said
body;
said body having an internal diameter being substantially
equal to said external diameter of said tubing;
said open mouth of said body is configured to receive a
portion of said tubing and press said one or more pairs
of blades into a portion of said tubing;
said body comprises a lip around an exterior surface of
said first cylindrical portion of said body; and
with said cap assembled around a portion of said body,
said lip selectively holds said cap around said body.

9. A shaping tool for cutting and shaping a portion of a tubing having an external diameter, said shaping tool comprising:
a cap, a blade portion and a body;
said blade portion comprises a one or more pairs of blades;
said body having a slot being substantially vertical;
said blade portion freely slides vertically through said slot;
said cap comprises a first cylindrical portion with an open mouth at a lower end and an enclosed top portion at an upper end;
said body comprises a first cylindrical portion with an open mouth at a lower end and a partially top portion at an upper end;
said open mouth of said cap comprising an internal diameter being greater than an external diameter of said body;
said shaping tool comprising an assembled configuration comprising
said blade portion held between said cap and said body and partially within said slot, and
said one or more pairs of blades exposed within said body;
said body having an internal diameter being substantially equal to said external diameter of said tubing;
said open mouth of said body is configured to receive a portion of said tubing and press said one or more pairs of blades into a portion of said tubing;
said body comprises a central axis;
said slot in said body is off of said central axis;
said blade portion, while seated in said slot, is off of said central axis.

* * * * *